Aug. 27, 1946.　　D. B. PARKINSON　　2,406,397
WIRE WINDING MACHINE
Filed Nov. 19, 1942　　2 Sheets-Sheet 1

INVENTOR
D. B. PARKINSON
BY J. MacDonald
ATTORNEY

Aug. 27, 1946.　　　D. B. PARKINSON　　　2,406,397
WIRE WINDING MACHINE
Filed Nov. 19, 1942　　　2 Sheets-Sheet 2

INVENTOR
D. B. PARKINSON
BY
J. MacDonald
ATTORNEY

Patented Aug. 27, 1946

2,406,397

UNITED STATES PATENT OFFICE 2,406,397

WIRE WINDING MACHINE

David B. Parkinson, Maplewood, N. J., assignor to Bell Telephone Laboratories, Incorporated, New York, N. Y., a corporation of New York Application November 19, 1942, Serial No. 466,132

3 Claims. (Cl. 242—9)

This invention relates to winding machines and more particularly to machines for winding strand material onto supports.

The object of the invention is to provide a machine capable of accurately winding a wire onto a flat support, and particularly supports having irregular contours.

The invention resides in a winding head operable to wind the wire onto the flat support and carrying a supply of the wire.

In making wire wound electrical devices comprising a flat strip of insulating material and a winding of wire on the strip, and more particularly in making so-called tapered form resistance elements comprising a tapered flat strip of insulating material and a resistance winding on the strip, it is often found difficult to accurately wind the wire onto the strip due to the fact that the distance between the point of application of the wire to the strip and the means for feeding the wire to the strip is changing during the winding operation. The wire extending from the source of supply to the strip must be maintained taut while the wire is being wound onto the strip. The tension of the wire, however, must not be such as to cause breaking the wire or distorting the strip and the tension on the wire must be maintained as nearly uniform as possible during the cycle of winding the wire onto the strip.

In the present invention the winding machine is constructed to hold the strip against distortion and means are provided in the winding head to maintain the wire substantially uniformly taut during the winding operation.

Figure 1:
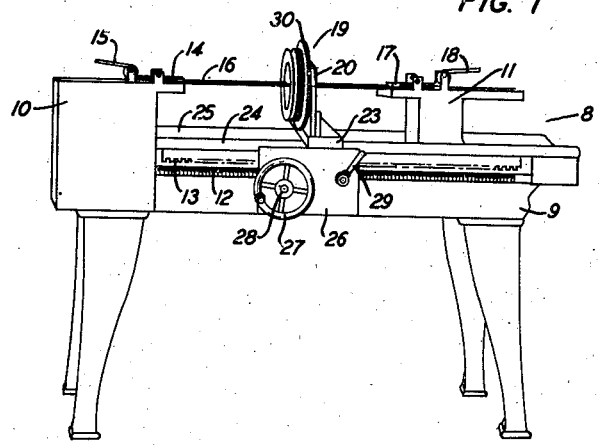
Fig. 1 is a view in perspective of the winding machine with a flat support in position therein ready to have a wire wound thereon.

As shown in Fig. 1 the winding machine 8 may follow the general form of a lathe comprising a bed 9, a head 10, an adjustable tail-stock 11, a lead screw 12 and a rack 13, the lead screw 12 being rotatable by means of gears, not shown, but housed in the head 10, and the rack 13 being secured to or an integral part of the bed 9. The head 10 is equipped with a clamping device 14 operated by means of a handle 15 to hold one end of a strip 16 of insulating material and which may be of the form shown in Fig. 7. The tail-stock 11 is equipped with a clamping device 17 operated by means of a handle 18 to hold the other end of the strip 16, the tail-stock 11 being adjustable along the bed 9 to accommodate different lengths of insulating strips and so that the strip 16 may be held rather tautly supported by the head and tail-stock portions of the machine.

The winding head 19 shown in Figs. 1, 2, 3 and 4 comprises a frame 20 extending upwardly about the position of the strip 16 and supported on a base 21 by means of screws 22. The base 21 is supported on a carriage 23 which rests on spaced tracks 24 and 25 on the bed 9. The carriage 23 is equipped with an apron 26 carrying means for moving the carriage 23 along the tracks 24 and 25. The means for moving the carriage 23 along the tracks 24 and 25 may comprise a handwheel 27 mounted on a rotatable shaft 28 which is gear connected to the rack 13, and a releasable clutch, not shown, but operated by means of a handle 29 to drive-connect the carriage 23 to the lead screw 12. When the handle 29 is operated to disconnect the carriage from the lead screw 12 and the wheel 27 is turned, the carriage 23 will be moved along the tracks 24 and 25 under control of the operator of the machine. By suitable operation of the handle 29 the operator may drive-connect the carriage 23 to the lead screw 12 so that the lead screw 12 will cause movement of the carriage 23 along the tracks 24 and 25, the lead screw 12 being driven by means of gears, not shown, but housed in the head 10.

Figure 4:
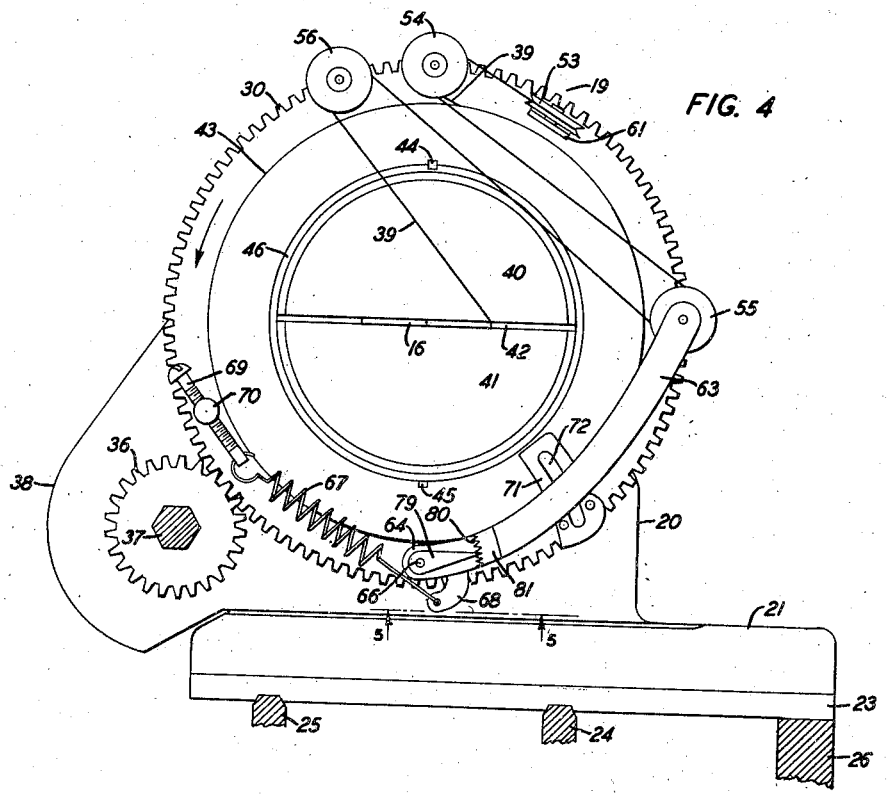
Fig. 4 is a plan view of the winding head taken from the left of Fig. 2.
Figure 5:
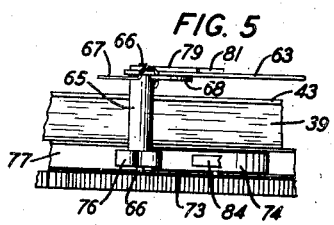
Fig. 5 is an edge view of fragmentary portions of the winding head taken on the line 5—5 in Fig. 4.

A ring gear 30 is rotatably supported in the winding head 19 by means of a plurality of wheels 31 which are arranged to provide supporting means for the ring gear 30. Each wheel 31 is rotatably supported on suitable bearing means 32, one portion of which is supported on a bolt 33 mounted in the frame 20. In the construction shown the wheels 31 are arranged to provide a three-point support for the ring gear 30 which is internally grooved at 34 to receive the peripheral edges 35 of the wheels 31, suitably formed to fit into the groove 34. The ring gear 30 is rotated by means of a pinion 36 which, as shown in Fig. 4, is rotated by and slidably mounted on a rotatable shaft 37 extending in spaced relation with and along the back of the bed 9, the shaft 37 being driven by means of gears, not shown, but located in the head 10. The shaft 37 is hexagon in cross section and the pinion 36 is apertured to accommodate the shaft 37 but slides along the shaft 37 when the carriage 23 is moved along the tracks 24 and 25, the pinion 36 being journaled on a bearing, not shown, but mounted on an extension 38 of the frame 20. When the shaft 37 is rotated the pinion 36 is rotated and drives the ring gear 30. Rotation of the ring gear 30 in a counterclockwise direction will cause a wire 39 to be wrapped around the strip 16 which is so supported by means of the clamping devices 14 and 17 that the ring gear 30 will rotate around the stationarily held strip 16.

The strip 16 may be a comparatively thin strip of sheet material such as phenol fiber or semi-hard rubber. To prevent undue bending or distortion of the strip 16 from its required form and position while the wire 39 is being wound on the strip, two semicircular plates 40 and 41 are provided in the winding head 19. The plates 40 and 41 are supported on the frame 20 and extend through the aperture in the ring gear 30 and almost to the point of application of the wire 39 to the strip 16. Plate 40 is arranged to extend transversely across the upper surface of the strip 16 to hold the strip 16 against undue upward movement and distortion during the winding operation. Plate 41 is spaced a sufficient distance below plate 40 as shown at 42 to accommodate the thickness of the strip 16 and prevents undue downward movement and distortion of the strip 16 during the winding operation.

A spool 43 keyed at 44 and latched at 45 to a spool support 46 is provided in the winding head 19 to carry a supply of the wire 39. The spool support 46 is annular in form and is supported on a plurality of small wheels 47 which are space-mounted on the ring gear 30 to provide three points of support for the spool support 46, each wheel 47 being mounted on a suitable bearing supported on a bearing support 48 mounted on the ring gear 30. The spool support 46 is of smaller outside diameter than the ring gear 30 and comprises an annular body portion 49 and an annular flange portion 50 which is of smaller diameter than the body portion 49 and arranged to provide a hub for the spool 43. The body portion 49 is recessed to accommodate the three wheels 47 and has an annular groove 51 formed in the inner surface of the wall to receive the peripheral edge portions of the wheels 47. It will be seen, therefore, that the ring gear 30 may roll around on the wheels 31 supported on their means of support on the frame 20 while the spool 43 and the spool support 46 are held stationary, and that the spool support 46 may roll around on the wheels 47 supported on their means of support on the ring gear 30; also, that the ring gear 30 and the spool support 46 carrying the spool 43 may each rotate at a speed different from the other.

The ring gear 30 carries means for carrying the wire 39 from the spool 43 around the strip 16 so that the wire 39 will be wrapped around the strip 16. The ring gear 30 also carries means for guiding the wire 39 to the required point of application on the strip 16 and means for maintaining the wire 39 in a taut condition while the wire is passing from the spool 43 to the strip 16.

The means above mentioned comprises a system of pulleys 52, 53, 54, 55 and 56 over which the wire 39 is run in its passage from the spool 43 to the strip 16. The pulleys 52, 53 and 56 are disposed at different points on the ring gear 30 so that the wire 39 in its passage from the spool 43 to the strip 16 will run in a system of loops and the wire 39 will be guided in its passage from the spool 43 to the required point of winding on the strip 16. Brackets of suitable form mounted on the ring gear 30 and supporting low friction type bearings for the pulleys are located at the various points required for the pulleys and the locations of the pulleys are such that the pulleys will be clear of the spool 43. The pulley 52 is supported on a bearing 57 which is supported on a bracket 58 mounted on the ring gear 30, the pulley 52 being in parallel spaced relation with the inner flat surface of the ring gear 30 and in such position that the wire 39 may be readily run from the spool 43 around the pulley 52. The pulley 54 is located in the same axial line as the pulley 52 and is supported on a bearing 59 which is separate from the bearing 57. Pulley 53 is mounted on a bearing 60 supported on a bracket 61 mounted on the ring gear 30 and rotates in a plane 90 degrees different from the plane of rotation of the ring gear 30 and the planes of rotation of the other pulleys in the system.

Figure 2:
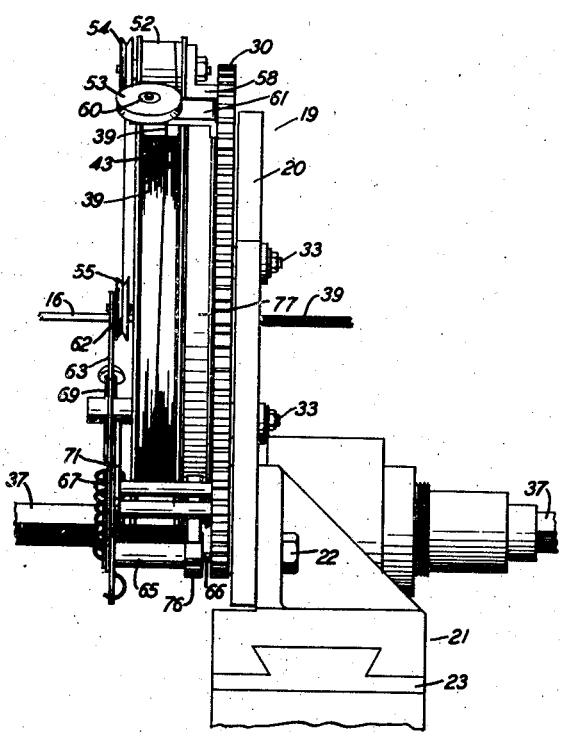
Fig. 2 is an enlarged view of the winding head supported on a carriage and showing a portion of the support on which the wire is being wound.
Figure 3:
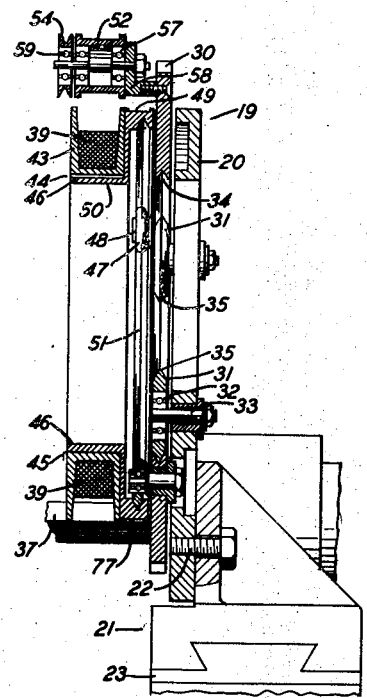
Fig. 3 is a view corresponding to Fig. 2 but without the support and showing certain of the parts in cross section.

The pulley 55 is mounted on a suitable bearing 62 supported on the free end of a movable arm 63 which is pivotally supported at one end 64 on a rotatable hollow shaft 65 telescoped over a pin 66 mounted at one end in the ring gear 30 and extending normally from the flat plane of the ring gear 30. The free end of the arm 63 will be moved from the position shown in Fig. 4 and so that the pulley 55 is brought nearer to the strip 16 when the tension on the wire 39 increases. A restoring spring 67 is provided to urge the arm 63 toward normal position when the tension on the wire 39 is reduced. The spring 67 is attached at one end to an ear 68 which is secured to the arm 63 and the other end of the spring 67 is secured to a screw 69 adjustably mounted in a stud 70 mounted on the ring gear 30. By turning the screw 69 the tension of the spring 67 may be increased or decreased to meet a required tension for the wire 39. The course of the wire 39 through the system of pulleys is indicated in Figs. 2 and 4 in which the wire 39 coming from the spool 43 passes under and then over the pulley 52, around pulley 53, pulley 54, pulley 55, pulley 56 and from pulley 56 to the strip 16.

As shown in Fig. 4 when the winding machine 8 is operating to wind wire 39 onto the strip 16 and the strip 16 is held stationary in the machine and the ring gear 30 rotates in the direction indicated by the arrow, the ring gear 30 being rotated by means of pinion 36 which is driven by means of the shaft 37. The winding head 19 is moved along the bed of the machine by means of the lead screw 12 so that the winding head 19 travels lengthwise of the strip 16 and helically winds the wire 39 onto the strip 16. It will be seen that due to the form of the strip 16 and the position of the pulley 56 the distance between the pulley 56 and the point of application of the wire 39 to the strip 16 changes and that these changes would have the effect of changing the tension of the wire running through the pulley system except for the fact that the arm 63 under action of the pull on the wire 39 and the counteracting pull of the spring 67 move the pulley 55 relative to the pulleys 54 and 56. When the instant point of application of the wire 39 is on the right of the strip 16 and the pulley 56 is in the position shown in Fig. 4, the free end of the arm 63 and the pulley 55 are drawn toward the strip 16 against the action of the spring 67. It will be seen that as the ring gear 30 continues to rotate and the distance between the pulley 56 and the right edge of the strip 16 increases, the free end of the arm 63 and the pulley 55 will be drawn still nearer to the strip 16. Upon further rotation of the ring gear 30 so that the wire 39 is brought into engagement with the left edge of the strip 16 and while the wire 39 is passing over the left edge of the strip 16, the free end of the arm 63 and the pulley 55 move outwardly under the influence of spring 67 to take up the slack that would otherwise be created in the run of the wire 39 through the pulley system. A bracket 71 having an elongated curved aperture 72 formed therein and a pin, not shown, extending from the arm 63 into the aperture 72 are provided to limit the movement of the arm 63, the bracket 71 being supported on the frame 20 and extending transversely of the arm 63.

Figure 6:
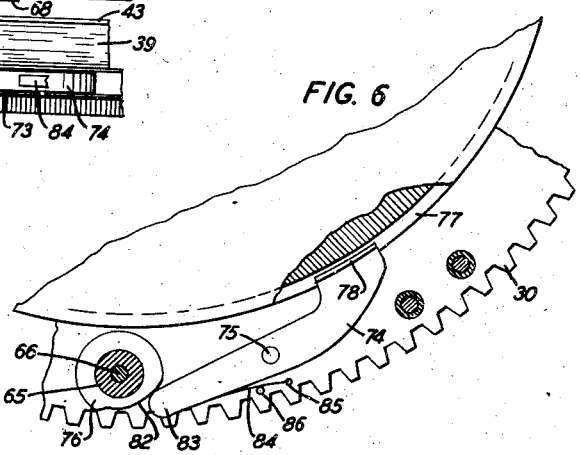
Fig. 6 is an enlarged view, partly in section, of fragmentary portions of the winding head shown in Fig. 4 and showing the brake means for controlling the rotation of a spool of wire.

Spool 43 rotates in the same direction as the ring gear 30 and rides on the wheels 47, the spool being pulled around by means of the wire 39 as the wire 39 is being wound onto the strip 16. To prevent overspeed of the spool 43 such as might result in reducing the tension on the wire 39, a brake 73 is provided. The brake 73 as shown in Fig. 6 comprises a brake arm 74 pivotally supported on a pin 75 mounted on the ring gear 30, a cam 76 attached to one end of the rotatable shaft 65 and a brake drum 77 formed on the periphery of the body portion 49 of the spool support 46. The brake shoe portion 78 of the brake arm 74 is moved into frictional engagement with the brake drum 77 by means of the cam 76 which is rotated by means of the arm 63 under action of its restoring spring 67, the cam 76 being attached to the rotatable shaft 65, which is mechanically connected to the arm 63, by means of a finger 79 one end of which is journaled on the pin 66 and secured to the shaft 65. The other end of the finger 79 is adjustably set in teeth 80 provided on a plate 81 which is secured to arm 63. The cam 76 is cut away to provide a low portion 82 against which the rear end 83 of the brake arm 74 is pressed by means of a spring 84 mounted on a pin 85 on the ring gear 30, a stop pin 86 also mounted on the ring gear 30 being provided to hold the spring 84 pressed against the brake arm 74. When the cam 76 is rotated to bring the low portion 82 past the end 83 of the brake arm 74, the shoe 78 frictionally engages the brake drum 77 to slow down the rotation of the spool support 46 so that the spool support 46 and the spool 43 will rotate at a slower speed than the ring gear 30. The cam 76 may be manually set to various positions so that slight or more considerable rotation of the cam 76 will be required to bring the low spot 82 past the end 83 of the brake arm 74. The setting of the cam 76 to the required position may be accomplished by manually moving the finger 79 in the teeth 80 since the finger 79 is journaled on the pin 66 and is secured at its pivoted end to the shaft 65.

Figure 7:
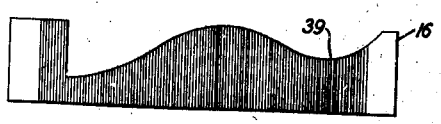
Fig. 7 shows one of various forms of support the machine will accurately wind with wire and with a wire winding on the support.

Assuming that the strip 16 is made of fiber or semihard rubber and is of the form shown in Fig. 7, that the strip 16 is clamped in the winding machine 8 as shown in Fig. 1 and that the machine is being operated to wind the wire 39 onto the strip 16, the arm 63 will operate to maintain the wire 39 taut while the wire is passing from the spool 43 to the strip 16. The tension on the wire 39 should be such that the wire will slightly press into the edge portions of the strip 16, the tension being set by adjustment of the spring 67 through operation of the screw 69. As the wire 39 is paid out and the distance between the pulley 56 and the point of winding the wire onto the strip 16 changes, the arm 63 and the pulley 55 are moved in accordance with the pull on the wire and the pull of the spring 67 to maintain the wire taut without breaking the wire 39. Movement of the arm 63 causes movement of the cam 76 which is adjusted so that the low spot 82 will be moved entirely past the end 83 of the brake arm 74 when the pulley 56 comes relatively near and passes by an edge of the strip 16. The brake arm 74 is therefore operated by means of the higher portion of the cam 76 and the shoe portion 78 engages the brake drum 77 to slow down the rotation of the spool support 46 and the spool 43. This braking action and movement of the arm 63 and pulley 55 prevent overspeeding of the spool 43 and the development of slack in the wire 39.

It will be seen that the various operations of the arm 63 and pulley 55 and the brake 73 will result in maintaining the wire substantially uniformly taut during the winding operation and that strips of rectangular form or having a curved edge such as shown in Fig. 7 may be wound with wire by means of the winding machine 8 without having the tension on the wire 39 reduced to such an extent as to be insufficient to partly embed the wire 39 in edge portions of the strip 16.

What is claimed is:

1. A winding machine for winding strand material onto a support comprising means for holding said support in taut condition, a winding head, a rotatable ring, a spool and a rotatable holder for said spool operable to rotate around the position of said support, means to rotate said ring, means to cause relative movement of said winding head and said means for holding said support, a pivoted arm carried by means of said rotatable ring and movable toward and away from the position of said support, means to move said arm away from the position of said support, a system of pulleys carried by said ring and a pulley in said system carried by said arm, said spool carrying a supply of said strand material and said system of pulleys being arranged to guide said strand material from said spool to said support, a brake operable to control rotational movement of said spool and holder for said spool and operated by means of said arm, said spool and holder for said spool being rotatable under the pull of said strand material as said strand material is being wound onto said support, and said arm and said brake being operable in conjunction to maintain said strand material taut while said strand material is passing from said spool onto said support.

2. A winding machine for winding strand material onto a flat support comprising means for holding said support in taut condition, a winding head, a ring rotatably supported in said winding head, a spool, a spool support keyed to said spool, means supported on said ring and rotatably supporting said spool support, said ring, spool and spool support being rotatable around the position of said flat support, a supply of said strand material on said spool, a pivotally supported arm carried on said ring, the free end of said arm being movable toward and away from the position of said flat support, spring means operating to urge the free end of said arm away from the position of said flat support, a system of pulleys to guide said strand material from said spool to said flat support, a part of said system of pulleys being carried on the free end of said arm, the other parts of said system being carried on said ring, a brake device operable against said spool support to retard rotational movements of said spool and spool support, said brake device being mechanically connected to and operable by means of said arm, means to rotate said ring at a constant speed, means to cause relative movement of said winding head and said flat support, said winding head being operable to wind said strand material onto said flat support, said spool and spool support being rotated by the pull of said strand material running through said system of pulleys, said arm being operated against the action of its spring means toward the position of said flat support under the pull of said strand material and operating to maintain said strand material taut as it runs through said system of pulleys onto said support and said brake device operating to prevent overspeeding of said spool and spool support relative to the rotational speed of said ring while said strand material is passing over an edge of said flat support.

3. A wire winding machine for winding wire onto a flat strip-type support having relatively wide and narrow portions comprising means for holding said support in taut condition, a frame extending in spaced relation about the position of said support, a set of wheels supported in spaced relation on said frame, a ring rotatably supported on said wheels and operating around the position of said support, a second set of wheels supported in spaced relation on said ring, a spool carrying a supply of said wire, a spool support keyed to said spool and rotatably supported on said second set of wheels, said spool and spool support being rotatable around the position of said support, two semicircular plates supported on said frame and extending into close relation with opposite flat surfaces of said support and substantially filling the space defined by said spool, means to rotate said ring, means to cause relative movement of said frame and support and lengthwise of said support, an arm pivotally supported at one end and carried by said ring, a system of pulleys for feeding said wire from said spool onto said support, one of said pulleys being carried on the free end of said arm and the others on said ring, spring means mechanically connected to said ring and said arm and operating to constantly urge the free end of said arm outwardly of the position of said support and against the pull of said wire, a brake drum formed on the periphery of said spool support, a brake device operable to frictionally engage said brake drum, a cam mechanically and adjustably connected to the pivoted end of said arm and arranged for operation of said brake device, said arm operating to maintain said wire in a taut condition as said wire runs from the beginning of said pulley system and from said system to said support, and said brake device operating to slow down the rotation of said spool support and cooperate with said arm in maintaining said wire taut when said wire is passing across an edge portion of said support or across a comparatively narrow portion of said support.

DAVID B. PARKINSON.